US007359849B2

(12) United States Patent
Palmquist (10) Patent No.: US 7,359,849 B2
(45) Date of Patent: Apr. 15, 2008

(54) TRANSLATION TECHNIQUES FOR ACRONYMS AND AMBIGUITIES

(75) Inventor: Robert D. Palmquist, Faribault, MN (US)

(73) Assignee: Speechgear, Inc., Northfield, MN (US)

( * ) Notice: Subject to any disclaimer, the term of this patent is extended or adjusted under 35 U.S.C. 154(b) by 0 days.

(21) Appl. No.: 11/014,213

(22) Filed: Dec. 16, 2004

(65) Prior Publication Data

US 2005/0171758 A1    Aug. 4, 2005

Related U.S. Application Data

(60) Provisional application No. 60/530,356, filed on Dec. 17, 2003.

(51) Int. Cl.
*G06F 17/28* (2006.01)
(52) U.S. Cl. .............................................. 704/5; 704/4
(58) Field of Classification Search ................ 704/277, 704/2, 8, 9, 5, 7, 4
See application file for complete search history.

(56) References Cited

U.S. PATENT DOCUMENTS

| 4,800,522 | A | 1/1989 | Miyao et al. |
| 5,161,105 | A | 11/1992 | Kugimiya et al. |
| 5,289,375 | A | 2/1994 | Fukumochi et al. |
| 5,497,319 | A | 3/1996 | Chong et al. |
| 5,535,120 | A | 7/1996 | Chong et al. |
| 5,594,642 | A | 1/1997 | Collins et al. |
| 5,701,497 | A | 12/1997 | Yamauchi et al. |
| 5,729,694 | A | 3/1998 | Holzrichter et al. |
| 5,748,974 | A | 5/1998 | Johnson |
| 5,815,196 | A | 9/1998 | Alshawi |
| 5,848,388 | A | 12/1998 | Power et al. |
| 5,917,944 | A | 6/1999 | Wakisaka et al. |
| 5,956,668 | A | 9/1999 | Alshawi et al. |
| 5,974,372 | A | 10/1999 | Barnes et al. |
| 5,995,920 | A * | 11/1999 | Carbonell et al. ............. 704/9 |
| 6,148,105 | A | 11/2000 | Wakisaka et al. |
| 6,154,720 | A | 11/2000 | Onishi et al. |
| 6,233,561 | B1 | 5/2001 | Junqua et al. |
| 6,278,967 | B1 | 8/2001 | Akers et al. |
| 6,278,968 | B1 | 8/2001 | Franz et al. |
| 6,393,389 | B1 * | 5/2002 | Chanod et al. ................ 704/7 |

(Continued)

FOREIGN PATENT DOCUMENTS

| JP | 07191995 A | 7/1995 |
| WO | WO 99/08202 A1 | 2/1999 |

(Continued)

OTHER PUBLICATIONS

U.S. Patent Application entitled "Translator Database", U.S. Appl. No. 11/012,890, filed Dec. 15, 2004.

(Continued)

*Primary Examiner*—Tālivaldis Ivars Šmits
(74) *Attorney, Agent, or Firm*—Shumaker & Sieffert, P.A.

(57) ABSTRACT

In general, the invention is directed to translation techniques for acronyms and ambiguities. In one embodiment, translation of a source text into a target language includes identifying a potential acronym in the source text and presenting a translated acronym to the user as a candidate for translation of the acronym. In another embodiment, a user's response with respect to a first instance of an ambiguity is used to translate a second instance of the ambiguity in a set of related documents without any further user response.

19 Claims, 5 Drawing Sheets

U.S. PATENT DOCUMENTS

| | | | |
|---|---|---|---|
| 6,463,404 B1* | 10/2002 | Appleby | 704/9 |
| 6,493,693 B1* | 12/2002 | Hill | 706/46 |
| 6,658,627 B1* | 12/2003 | Gallup et al. | 715/536 |
| 6,983,221 B2* | 1/2006 | Tracy et al. | 714/38 |
| 6,996,030 B2* | 2/2006 | Goodman et al. | 367/176 |
| 7,089,236 B1* | 8/2006 | Stibel | 707/5 |
| 2001/0029455 A1* | 10/2001 | Chin et al. | 704/277 |
| 2002/0032561 A1 | 3/2002 | Ishikawa et al. | |
| 2002/0040359 A1* | 4/2002 | Green et al. | 707/3 |
| 2002/0049589 A1 | 4/2002 | Poirier | |
| 2002/0065647 A1 | 5/2002 | Hatori et al. | |
| 2002/0156816 A1 | 10/2002 | Kantrowitz et al. | |
| 2004/0044517 A1 | 3/2004 | Palmquist | |
| 2004/0122656 A1* | 6/2004 | Abir | 704/4 |
| 2004/0148156 A1* | 7/2004 | Hawkins | 704/10 |
| 2004/0254782 A1* | 12/2004 | Li | 704/8 |

OTHER PUBLICATIONS

Notification of Transmittal of the International Search Report and Written Opinion for corresponding patent application No. PCT/US2004/042223, mailed Mar. 7, 2006, (12 pages).

International Preliminary Examination Report from corresponding PCT Application Serial No. PCT/US04/42223 mailed Sep. 1, 2006 (11 pages).

Prosecution history U.S. Appl. No. 10/234,015 including: Non-Final Rejection dated Feb. 18, 2004, Rule 130, 131 or 132 Affidavits dated Aug. 20, 2004, Rule 130, 131 or 132 Affidavits dated Aug. 20, 2004, Rule 130, 131 or 132 Affidavits dated Aug. 20, 2004, Rule 130, 131 or 132 Affidavits dated Aug. 20, 2004, Amendment dated Aug. 20, 2004, Non-Final Rejection dated May 24, 2005, Amendment dated Sep. 26, 2005, Non-Final Rejection dated Dec. 29, 2005, Amendment dated Mar. 31, 2006, Final Rejection dated Jun. 21, 2006, Amendment submitted with RCE dated Oct. 20, 2006, Non-Final Rejection dated Jan. 10, 2007, Amendment dated May 10, 2007, Final Rejection Aug. 8, 2007, Amendment submitted with RCE dated Oct. 9, 2007, Non-Final Rejection dated Nov. 30, 2007.

Office Action from related Chinese Application Serial No. 03820664.1 dated Apr. 6, 2007 (23 pages).

Office Action from corresponding Chinese Application Serial No. 200480037831.0 dated Oct. 12, 2007 (10 pages).

* cited by examiner

TRANSLATION TECHNIQUES FOR ACRONYMS AND AMBIGUITIES

This application claim the benefit of U.S. Provisional Application Ser. No. 60/530,356, filed Dec. 17, 2003 the entire content of which is incorported herein by reference.

STATEMENT REGARDING FEDERALLY SPONSORED RESEARCH OR DEVELOPMENT

This invention was made with Government support under Contract N00014-02-C-0122 and Contract N00014-03-C-0272 awarded by Office of Naval Research. The Government may have certain rights in this invention.

TECHNICAL FIELD

The invention relates to electronic communication, and more particularly, to electronic communication with language translation.

BACKGROUND

As international interaction becomes more common, people are more likely to encounter a language barrier. The language barrier may arise in many situations, such as trade or negotiations with a foreign company, cooperation of forces in a multi-national military operation in a foreign land, correspondence with a foreign national or presentation of information to people from other nations.

There are commercially available computer programs that can receive a document with text in a source language and translate the text to a target language. These programs are, however, prone to error. As a result, the resulting document with the target language may not convey the intended meaning. Translation may also affect the formatting of the resulting document, so that the resulting document looks different from the source document.

SUMMARY

In general, the invention is directed to text translation tools that are especially useful for translation of related electronic documents. Related electronic documents are any documents in electronic form that are related to one another, such as electronic slides, spreadsheet entries, pages of a book, a set of collected text files, a set of drawings that include text, and the like.

The invention provides for translating source text from a source document in a source language into target text in a target language. The invention further provides for mapping the target text to target document according to the format characteristics of the source text. As a result, the target document preserves some of the "look and feel" of the source document. In source documents that include one or more graphic elements, the invention supports mapping the graphic elements to the target document.

In an exemplary application, a user can translate a set of electronic source slides having text in a first language, generating a set of target slides in a second language that look similar to the source slides. The target slides generally preserve the graphic elements and format characteristics of the source slides.

The invention may be practiced by any of several translation devices executing any of several translation engines. In the event the translation device encounters an ambiguity, such as a potential acronym, the translation device may interrogate the user about the ambiguity, and may translate the source text into the target language based at least in part on the user's response to the interrogation. The translation device may also remember the manner in which the user resolved the ambiguity, and may resolve a later instance of the ambiguity in the same way without interrogating the user.

In one embodiment, the invention is directed to a method comprising presenting a source document to a user. The source document includes a source text in a source language and at least one graphic element. The method also includes mapping the graphic element to a target document, generating a target text by translating the source text into a target language, and mapping the target text to the target document.

In another embodiment, the invention presents a method. The method comprises identifying a first instance of an ambiguity in a first source document in a set of related electronic documents. The first source document includes a first source text in a source language. The method further comprises interrogating a user about the ambiguity, receiving a response from the user to the interrogation, and translating the first source text into the target language based at least in part on the response. When the a second instance of the ambiguity is identified in a second source document in the set of related electronic documents, the method comprises translating the second source text into the target language based at least in part on the response to the interrogation. The user need not be interrogated anew.

In further embodiments, the invention comprises a computer-readable medium comprising instructions for causing a programmable processor to carry out any of the above methods.

The invention is also directed to a system configured to carry out any of the methods. In an additional embodiment, invention presents a system comprising a display configured to present to a user a source document including a source text in a source language, to simultaneously present to the user a target document including a target text in a target language. The system also includes a processor configured to translate the source text into the target text, and further configured to map the target text to the target document according to a format characteristic of the source text.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
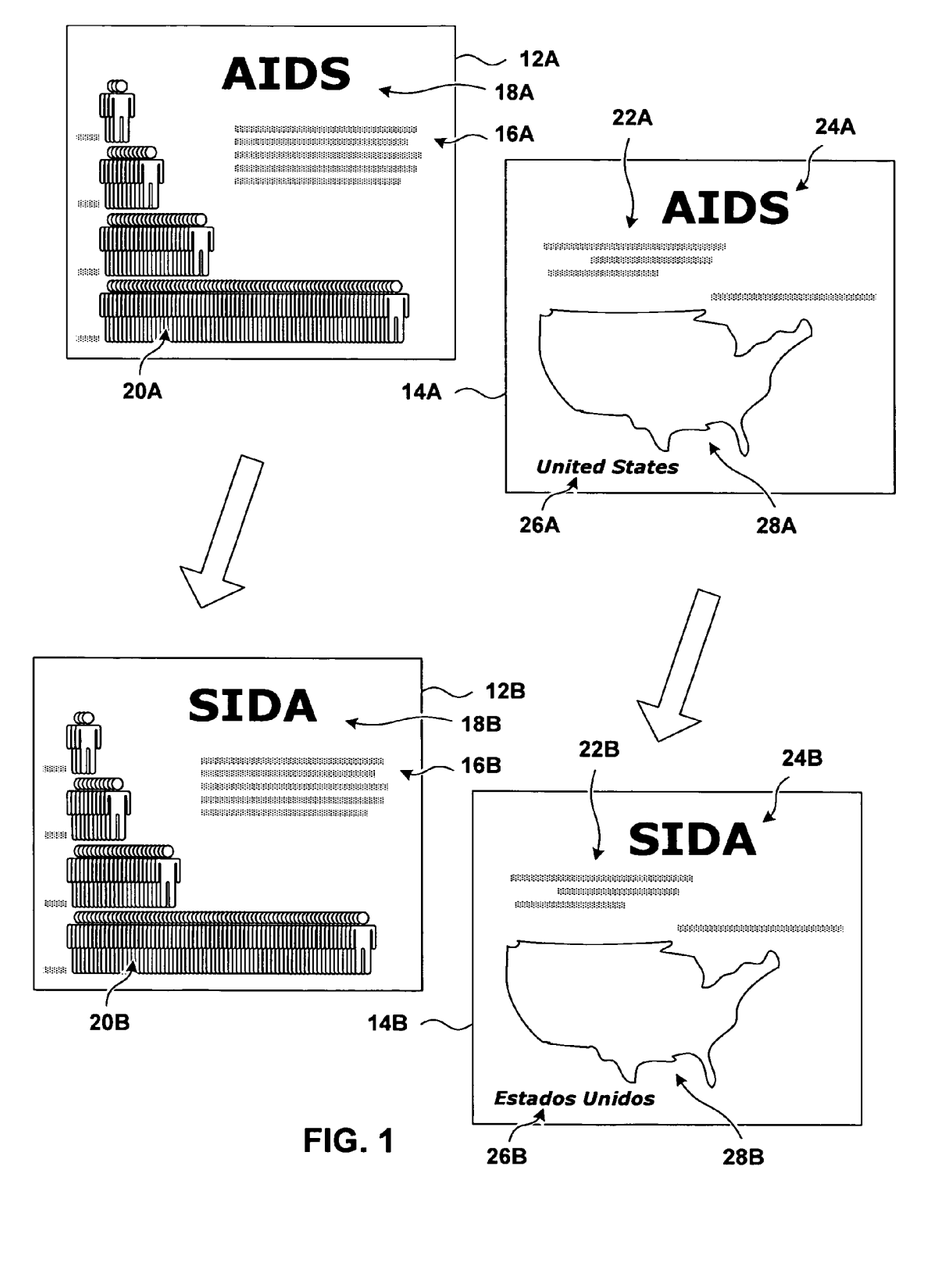
FIG. 1 is a conceptual diagram illustrating a set of related electronic documents and the translated versions thereof.

FIG. 1 is a conceptual diagram of a set of related electronic documents. In the example of FIG. 1, the documents comprise demonstrative exhibits that may accompany a presentation, such as slides of text and graphics stored electronically on a personal computer. The demonstrative exhibits may include, for example, a slide presentation prepared with an application such as Microsoft PowerPoint. The invention is not limited to slide presentations, however, but may be employed with other sets of related electronic documents, such as pages of a book or a set of collected reports.

In the example of FIG. 1, the subject of the presentation is a medical syndrome. The presentation may include any number of slides, but two slides 12A and 14A are shown. Slide 12A includes explanatory text 16A, additional text as a title 18A, and graphics element 20A. Similarly, slide 14A includes explanatory text 22A, a title 24A, additional text 26A, and graphics element 28A. In slides 12A and 14A, title 18A, 24A happens to be an acronym, "AIDS," which stands for Acquired Immune Deficiency Syndrome.

The invention provides techniques for translating related electronic documents from a source language to a target language. In FIG. 1, the source language is English and the target language is Spanish. Slides 12A and 14A are the "source" slides. The translated, or "target," slides are shown in FIG. 1 as slides 12B and 14B.

Target slides 12B and 14B include elements present in original source slides 12A and 14A. In particular, target slide 12B includes explanatory text 16B, additional text as a title 18B, and graphics element 20B. Similarly, slide 14B includes explanatory text 22B, a title 24B, additional text 26B, and graphics element 28B.

Notably, target slides 12B and 14B resemble source slides 12A and 14A in appearance. Although text has been translated from English to Spanish, most of the formatting of the slides has been preserved. In particular, size, font and position of text is approximately the same in the source slides 12A, 14A as in the target slides 12B, 14B. Attributes of the text, such as the italics of text 26A, are also preserved, as text 26B is likewise italicized. In addition, the position and size of graphics elements are approximately the same in the source slides 12A, 14A as in the target slides 12B, 14B.

The text of titles 18A and 24A happens to include an acronym, "AIDS," which in the example of FIG. 1 stands for "Acquired Immune Deficiency Syndrome." In target slides 12B and 14B, titles 18B and 24B likewise include an acronym. "SIDA," the Spanish acronym that corresponds to "AIDS," stands for "Sindrome de Immunodeficiencia Adquirida." As will be described below, the translation supports recognition of acronyms, preservation of acronyms in translated text, and acronym expansion when there is no comparable acronym in the target language. Furthermore, the invention supports one-time acronym handling, such that the translator may consistently translate an acronym appearing in the set of related electronic documents.

Figure 2:
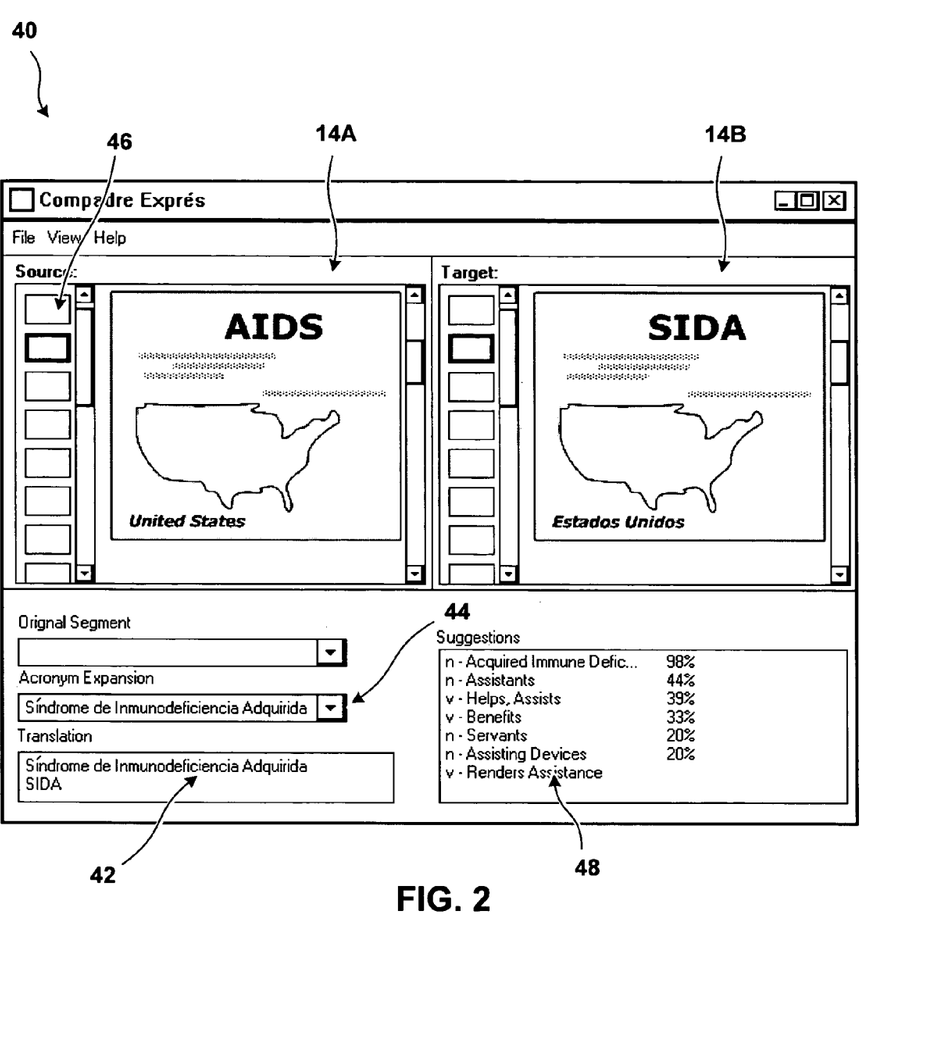
FIG. 2 is a screen shot of an exemplary display depicting simultaneous presentation of a source electronic document and a target electronic document.

FIG. 2 is an illustrative screen shot of a display 40 of an electronic document in a source language and the corresponding translated electronic document in the target language. In the example of FIG. 2, slides 14A and 14B are displayed side-by-side. The side-by-side display offers an easy comparison of the source and target slides 14A, 14B. With a single command, a user can translate all of the slides in the set, and can compare each target document to each source document when source and target documents are presented simultaneously. In this way, the user can see the source and target slides according to their actual layouts and format characteristics.

Display 40 also shows illustrative editing tools 42, which a user may use to correct, adjust or fine-tune the source or target documents. The tools depicted in FIG. 2 are for purposes of illustration, and the invention accommodates any editing tools. An advantage of the invention, however, is that less user editing may be needed. The invention provides for translation of text while preserving the graphics and formatting of the source document. It is often unnecessary for the user to "cut and paste" graphic elements from the source document to the target document, for example.

In an exemplary embodiment of the invention, a change to a source document or a set of source documents results in an automatic change to a target or a set of target documents. For example, addition of a new graphic element to source slide 14A results in the same graphic element being added to target slide 14B. Changes in the text in slide 14A automatically changes the corresponding translated text in slide 14B. Reordering of slides or addition of a new slide to the source set automatically results in a reordering or a new slide in the target.

Although a single target slide 14B is shown in FIG. 2, the invention supports multiple target documents. For example, a user may generate a first set of target documents in Spanish, a second set in French, a third set in Japanese, and so on. In one embodiment of the invention, a change to a source document or a set of source documents results in automatic changes to each target or to each set of target documents.

One exemplary editing tool is an acronym expander 44. An acronym expander identifies potential acronyms and provides a user one or more options concerning translation of acronyms. Operation of an exemplary acronym expander is described below.

Another exemplary tool is a slide selector 46. By selecting a slide on slide selector 46, the user can navigate among a set of related slides. Selecting the second slide of the source set, for example, may cause the second slide of both the source and target sets to appear. Similarly, selection of a particular target slide may cause a corresponding source slide to be selected automatically.

A further exemplary tool is a search tool 48 that finds other possible meanings of a word or phrase. The other possible meanings may be ranked according to criteria such as frequency of use by the general population. In the example of FIG. 2, search tool 48 ranks meanings according to previous usage by a user. Search tool 48 may further include a default translation of a word or phrase from a translation engine. A user may select any word or phrase in the source or target document, may receive a list of meanings and may select the meaning that is closest to the message the user wishes to convey.

The invention is not limited to the particular editing tools shown in FIG. 2. Moreover, the invention supports editing of the target documents without changing the source documents. A user may be satisfied with a source document but may be unsatisfied with a translation in the corresponding target document. Accordingly, the user may edit the target directly without changing the source document.

In general, target text in the target document has the same position, size, font, style, and other format characteristics defined by the source text in the source document. In some circumstances, however, it may not be feasible to preserve all of the format characteristics of the source text. The source text may include a word or phrase that translates to a longer word or phrase. Accordingly, the invention supports an automatic change of one or more format characteristics, such as selection of a different size or a different font for the target text.

The invention further supports a side-by-side display of source and target documents without any editing tools. When the user presents the slides to a group, display 40 may be configured to display the source and target slides simultaneously.

Figure 3:
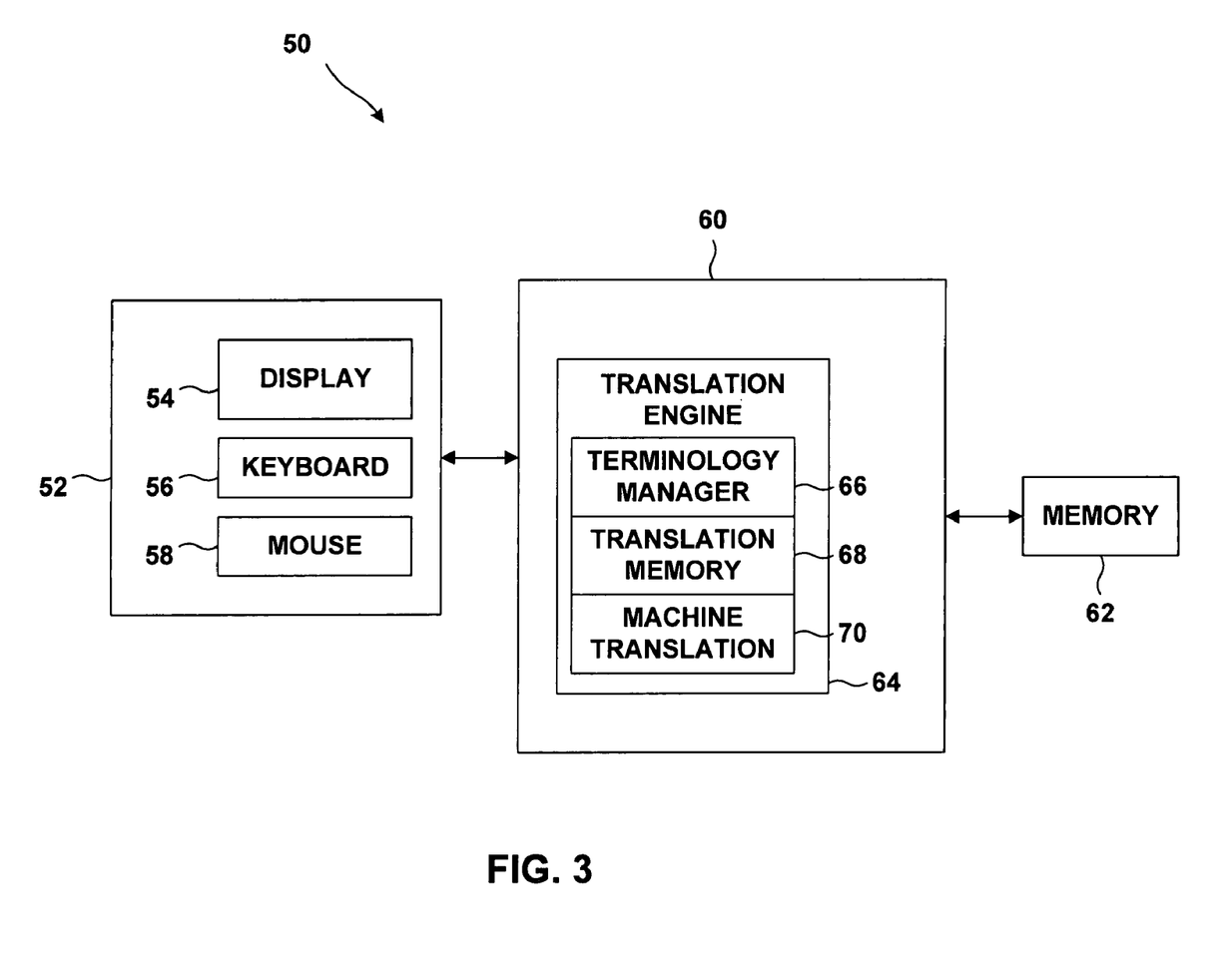
FIG. 3 is a block diagram illustrating an exemplary translation device that can practice the invention.

FIG. 3 is a functional block diagram of a computer system 50 that can carry out the techniques of the invention. Some of the components of computer system 50 are depicted as logically separate even though the components may be realized in a single device. Translation devices other than computer system 50 may also carry out the techniques of the invention.

The user interacts with computer system 50 through input/output devices 52. Input/output devices 52 may include a display 54, which is configured to present information to a user in visual form, such as the information presented via display 40 in FIG. 2. Input/output devices 52 may also include a keyboard 56 or a mouse 58. The invention is not limited to the particular input/output devices shown in FIG. 3, however, but may include input/output devices such as a touchscreen, a stylus, a touch pad, or audio input/output devices.

Computer system 50 includes a processor 60, which executes translation software. The translation software, which may be stored in memory 62, may be any of several commercially available translation packages. Memory 62 may include any form of information storage. Memory 62 may include random access memory, and may also include any of a variety computer-readable media comprising instructions for causing a programmable processor, such as processor 60, to carry out the techniques described herein. Such computer-readable media include, but are not limited to, magnetic and optical storage media, and read-only memory such as erasable programmable read-only memory or flash memory accessible by processor 60.

Memory 62 may further store the related electronic documents, such as slides, pages, chapters, and the like.

A typical translation software package includes a translation engine 64 that translates text from a source language to a target language. The invention also encompasses embodiments in which translation engine 64 is embodied as hardware, firmware or any combination of hardware, firmware and software.

A typical translation engine 64 may employ one or more specialized translation tools to convert a message from a source language to a target language. Specialized translation tools may include one or more terminology managers 66, which generally handle application-specific terminology, translation memory tools 68 and/or machine translation tools 70. Translation memory tools 68 generally reduce translation effort by identifying previously translated words and phrases, which need not be translated "from scratch." Machine translation tools 70 linguistically process a message in a source language "from scratch" by, for example, parsing the message and analyzing the words or phrases. Terminology manager 66, translation memory tools 68 and/or machine translation tools 70 are commercially available from several different companies. The invention encompasses a variety of translation engines, and is not limited to a particular translation engine or to any particular specialized translation tools.

In a typical implementation, computer system 50 refers to phrases stored in memory 62 before engaging the translation engine to translate a word or phrase "from scratch." Memory 62 may include one or more categories of words phrases, and the categories may be arranged in a hierarchy, according to criteria such as frequency of use and area of subject matter. Translation memory tools 68 may further support a search algorithm that matches, or attempts to match, a desired phrase to an expression already in memory 62.

In many cases, it is preferable for translation engine 64 to employ translation memory tools 68 to use existing expressions in memory 62 rather than to engage machine translation tools 70. In general, phrases in memory 62 may be deemed more reliable and closer to the intended meaning than translations performed "from scratch."

In some cases, translation engine 64 may encounter an ambiguity, such as a word or phrase that has multiple translations. The invention supports a "learning mode" in which memory 62 stores information about a user's previous translations of a word or a phrase. In one embodiment, translation engine 64 may automatically select a translation previously selected by the user. In another embodiment, translation engine 64 ranks possible meanings according to translations previously selected by the user.

Although computer system 50 is depicted as a stand-alone system, the invention also encompasses embodiments that are not stand-alone. For example, the invention includes embodiments in which input/output devices 52 are included in a local workstation, and processor 60 and/or memory 62 are remote. The user can access remote processor 60 and/or memory 62 via a network (not shown) such as the Internet, a cellular telephone network, a local area network or a wireless network.

Figure 4:
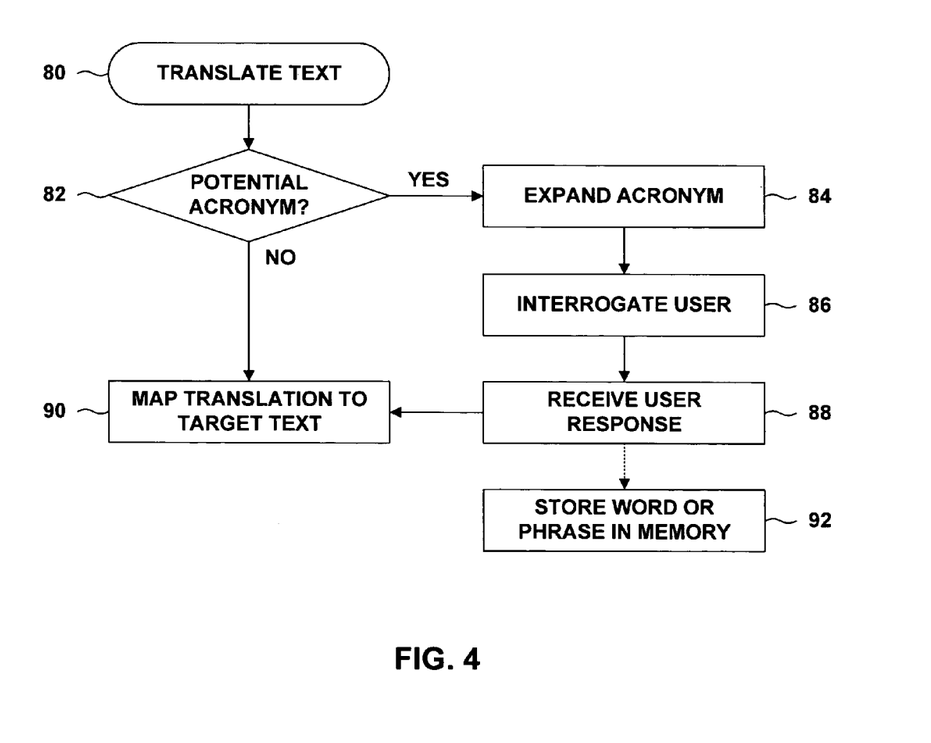
FIG. 4 is a flow diagram illustrating an acronym expansion operation for a translation device.

FIG. 4 is a flow diagram illustrating an exemplary operation of an acronym expander. In the course of translating text (80), the translation engine may identify a potential acronym (82). A potential acronym may be uniquely identified as an acronym. The term "USA," for example, may be identified with the United States of America. The term "CO" may be identified as a potential abbreviation of "company" or an acronym standing for "carbon monoxide" or "cardiac output," to name a few examples. The term "AIDS" may be an acronym or may be an ordinary word synonymous with "assistants" or "resources" or "helpful acts." When the translation engine encounters a potential acronym for the first time, the translation engine may expand the acronym, listing the known meanings.

The processor may interrogate the user (86) about an aspect of the source text in question. In particular, the processor may interrogate the user concerning the intended meaning of the potential acronym. The processor may present the expanded acronym to the user as one of the possible meanings of the term in question. The processor presents the interrogation and receives a response from the user (88) via one or more input/output devices. The response from the user reflects the intended meaning. The processor proceeds with translation as a function of the user's response and maps the translation to the target document (90).

In some circumstances, the translation may itself be an acronym. The English acronym "AIDS" translates to the Spanish acronym "SIDA," for example. The user may also select the expanded version of the acronym in question. When the processor encounters the acronym "USA," for example, the processor may present the user with a choice of the acronym translation "E.E.U.U." or an expanded translation such as "Estados Unidos."

After a user responds to the interrogation (88), the processor may store the word and/or phrase in memory (92). A translation device such as computer system 50 in FIG. 3 generally includes a database of vocabulary words and phrases in memory, and the term may be added to the database. If the processor encounters the same acronym, word or phrase at a later time in the same document or in a related electronic document, the processor may proceed with the same translation, without interrogating the user anew.

The user may have discretion to add the new acronym, word or phrase to memory permanently or temporarily. A temporary addition of the new term to memory makes the translation applicable to related electronic documents in a set, but not to electronic documents in other sets. In a set of electronic slides pertaining to health concerns, for example, the term "AIDS" may be consistently translated as "SIDA." In a set of electronic slides pertaining to a military command structure, however, use of "SIDA" would be inappropriate, and use of other terms such as "asistentes" ("assistants") may be appropriate. When translating a new set of related electronic documents, therefore, the processor may interrogate the user anew about translation of a term, even if the term was the subject of interrogation during translation of a preceding set of related electronic documents.

The user may also have discretion to specify a new expansion of an acronym. In a set of related electronic documents pertaining to information distribution, "AIDS" may stand for "Automated Information Distribution System." The user may have discretion to add the new expansion, and the translation thereof, to memory permanently or temporarily.

Figure 5:
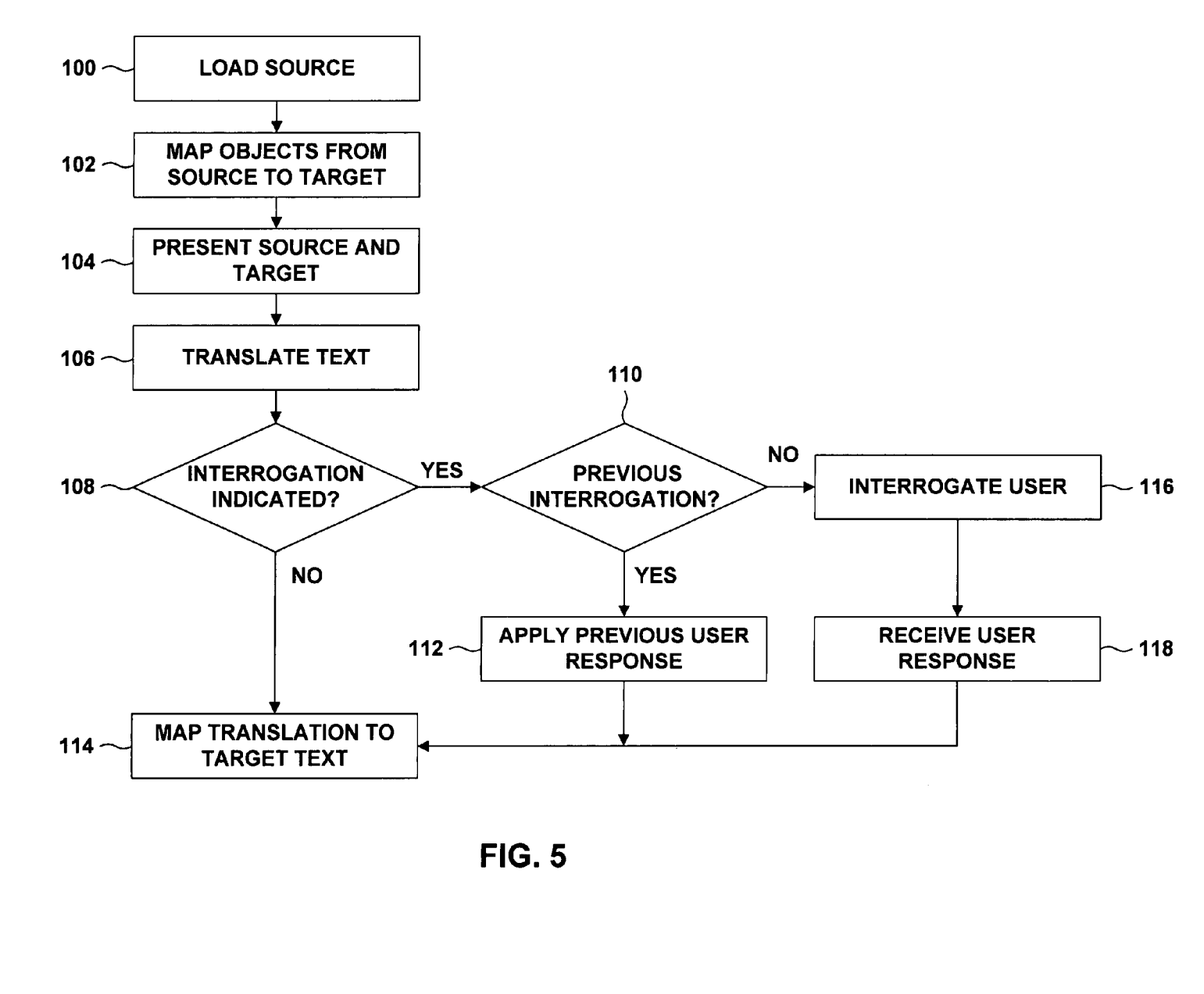
FIG. 5 is a flow diagram illustrating translation of a set of related electronic documents according to an embodiment of the invention.

FIG. 5 is a flow diagram illustrating translation of a set of related electronic documents. After loading a source document from memory (100), the processor maps objects in the source document to a target document (102). The processor copies graphic elements from source document to the target document, for example. The processor also notes the position, size, font, style, and other characteristics of text to be translated. The processor presents the source and target documents, or portions thereof, to the user (104). In an exemplary embodiment, the processor displays the source and target documents side-by-side, as shown in FIG. 2.

The processor translates text with the tools in translation engine 64 (106). As noted above, translation (106) may include searching for similar expressions stored in memory 62, or translating "from scratch," or both. At some point, the translation engine may encounter ambiguities that may affect the translation (108). Ambiguities could include acronyms as discussed above in connection with FIG. 4, or may include other matters in which the intended meaning is unclear.

When the processor encounters an instance of an ambiguity, the processor determines whether the ambiguity has been encountered on a previous occasion and whether the user has resolved the ambiguity by response to an interrogation (110). When the user has resolved the ambiguity already, the processor does not necessarily interrogate the user anew, but resolves the ambiguity according to the user's previous response (112). The processor proceeds with translation as a function of the user's previous resolution of the ambiguity and maps the translation into the target document (114). In a variation, the processor presents the user with a list of possible meanings. The list of meanings may be ordered, with the most frequent or most likely meanings presented first. The processor interrogates the user about the intended meaning and maps the translation into the target document as a function of the user's response.

Mapping the translation into the target document includes mapping the target text to the target document according to the format characteristics of the source text, thereby preserving at least one or more of the format characteristics of the source text. In some cases, mapping may include changing one or more format characteristics, such as selecting a smaller size or a different font for the target text.

When the user has not resolved the ambiguity, the processor interrogates the user about an aspect of the source text (116), receives the user's response to the interrogation (118), and proceeds with translation and mapping (114) as a function of the user's response. The target text is generally presented in the same position as the source text, with the same size, font, style, and other format characteristics of the source text. Mapping may also include, however, changing one or more format characteristics of the target text.

As noted above, the process of bypassing user interrogation may be used when the translation engine encounters potential acronyms. The process shown in FIG. 5 is not limited to application to acronyms, however. Colloquialisms and figures of speech, for example, may create ambiguities for a translation engine. Should the translation engine encounter the sentence "Hold the phone," for example, the translation engine may be unable to determine whether the sentence is a literal command to grasp a piece of telephonic equipment, or a figurative command to wait for a few moments. If, following interrogation, the user responds that the figurative sense was the intended one, the processor may apply the figurative sense without interrogation when the processor encounters the sentence "Hold the phone" in a related electronic document.

In connection with exemplary source slides 12A and 14A shown in FIG. 1, the translation engine may have interrogated the user upon encountering the first instance of "AIDS." Upon receiving the user's response that the acronym "SIDA" was an accurate translation, the processor may apply this translation to other instances of "AIDS" in other slides in the set.

In addition to one-time acronym handling, the invention may offer one or more additional advantages. The invention can, with few commands, translate a set of related electronic documents. The same techniques that can be applied to electronic slides can also be applied to cells of a spreadsheet, sets of spreadsheets, pages of a book, a set of collected text files, and a set of drawings that includes text. The invention is not limited to these applications, however.

In addition, the techniques of the invention reduce the interaction between the user and the translation device. In particular, once a user is interrogated about an acronym or an ambiguous term, the user need not be interrogated if the acronym or term is encountered again in the set of related electronic documents. The invention may therefore result in faster translation and enhanced ease of use.

The invention also preserves graphics, as well as attributes of the text. As a result, the target document can have the same "look and feel" as the source document. Preserving the look and feel has aesthetic benefits, in that the effort spent in making the original source slides attractive carries over to the target slides. There are also many practical benefits as well. A speaker of English making a PowerPoint presentation to a Spanish-speaking audience with the assistance of an interpreter, for example, can present PowerPoint slides in Spanish that correspond to familiar PowerPoint slides in English. The speaker's familiarity with the slides in English allows the speaker to have some familiarity with the slides in Spanish as well, thereby giving the speaker the opportunity to offer a well-coordinated multi-language presentation.

Several embodiments of the invention have been described. Various modifications may be made without departing from the scope of the invention. For example, the invention may be applicable to any number of source and target languages, and may be carried out by a variety of translation devices. The translation devices may also include capabilities not mentioned herein, such as speech recognition or voice synthesis.

Furthermore, the invention is not limited to related electronic documents that include graphics. The invention may be applied to electronic documents that include formatted text. The invention may load a source document and map translated text to a target document, with the target document incorporating one or more of the format characteristics of the source document. The position of the text, the justification of the text, whether the text is bold or italic or underscored, the fonts of the text, whether the text appears in all capitals, and so forth are all format characteristics that the invention can preserve.

The invention also includes embodiments that preserve fewer than all of the format characteristics. In an embodiment in which the source language is English and the target language is Korean, for example, the character sets for the languages differ. Preserving the font of the source text, for example, may not be desirable or feasible. In other embodiments, a format characteristic such as text size may be changed to accommodate a translation.

In addition, the invention includes some embodiments comprising any of a variety computer-readable media comprising instructions for causing a programmable processor, such as processor 60, to carry out the techniques described herein. Such computer-readable media include, but are not limited to, magnetic and optical storage media, and read-only memory such as erasable programmable read-only memory or flash memory. These and other embodiments are within the scope of the following claims.

The invention claimed is:

1. A computer-implemented method comprising:
presenting a source document to a user on a display, the source document including a source text in a source language and at least one graphic element;
mapping the graphic element to a target document on the display;
generating a target text by translating the source text into a target language on the display; and
mapping the target text to the target document on the display, wherein translating the source text into the target language includes identifying a potential acronym in the source text and presenting a translated acronym to the user as a candidate for translation of the acronym.

2. The method of claim 1, wherein the source text defines a format characteristic and wherein mapping the target text to the target document comprises mapping the target text to the target document according to the format characteristic of the source text.

3. The method of claim 2, wherein the format characteristic comprises at least one of a source text size, a position of the source text in the source document, and a font of the source text.

4. The method of claim 1, further comprising presenting the source document and the target document to a user simultaneously.

5. The method of claim 1, further comprising:
receiving a response from the user as to whether the translated acronym is correct; and
translating the source text into the target language based at least in pan on the response.

6. The method of claim 5, further comprising:
expanding the acronym,
wherein the response from the user identifies the expanded acronym as an intended meaning of the potential acronym and wherein translating the source text into the target language includes using the expanded acronym.

7. The method of claim 1, further comprising:
determining whether the user has previously responded to an Interrogation with respect to the potential acronym; and
translating the source text into the target language based at least in part on the previous response.

8. A computer-implemented method comprising:
for a first source document in a set of related electronic documents, the first source document including a first source text in a source language, identifying a first instance of an ambiguity in the first source text;
interrogating a user about the ambiguity;
receiving a response from the user to the interrogation;
translating the first source text into the target language based at least in part on the response;
identifying a second instance of the ambiguity in a second source document in the set of related electronic documents, the second source document including a second source text in the source language;
translating the second source text into the target language based on the response received from the user with respect to the first instance of the ambiguity in the first source document such that a translation of the second instance of the ambiguity in the second source document is the same as a translation of the first instance of the ambiguity in the first source document without any further user response with respect to the second instance of the ambiguity; and
displaying the translations on a display.

9. The method of claim 8, wherein translating the first source text into the target language comprises generating a first target text and wherein translating the second source text into the target language comprises generating a second target text, the method further comprising:
mapping the first target text to a first target document; and
mapping the second target text to a second target document.

10. The method of claim 9, wherein the first source text includes at least one graphic element, the method further comprising mapping the graphic element to the first target document.

11. The method of claim 9, wherein the first source text defines a format characteristic and wherein mapping the first target text to the first target document comprises mapping the first target text to the first target document according to the format characteristic of the first source text.

12. The method of claim 8, wherein the ambiguity comprises an ambiguity about an intended meaning of a potential acronym, wherein interrogating a user about the ambiguity comprises presenting a translated acronym to the user as a candidate for translation of the acronym and presenting a potential non-acronym translation as another candidate.

13. The method of claim 8, further comprising:
following identification of the second instance of the ambiguity, interrogating the user a second time about the ambiguity, wherein interrogating the user the second time comprises presenting a list of meanings ordered as a function of the response.

14. The method of claim 8, wherein the set of related electronic documents comprise one of a set of electronic slides, a set of cells of a spreadsheet, a set of pages of a book, a set of text flies, and a set of drawings that include text.

15. A method comprising:
    presenting a source document to a user, the source document including a source text defining at least one format characteristic;
    generating a target text by translating the source text into a target language; and
    mapping the target text to a target document according to the format characteristic, wherein translating the source text into the target language includes identifying a potential acronym in the source text and presenting a translated acronym to the user as a candidate for translation of the acronym.

16. The method of claim 15, wherein the source document further comprises a graphic element, the method further comprising mapping the graphic element to the target document.

17. The method of claim 15, wherein the format characteristic comprises at least one of a source text size, a position of the source text in the source document, and a font of the source text.

18. The method of claim 15, further comprising:
    receiving a response from the user as to whether the translated acronym is correct; and
    translating the potential acronym text into the target language based at least in part on the response.

19. A system comprising:
    a display configured to present to a user a source document including a source text in a source language, to simultaneously present to the user a target document including a target text in a target language;
    a processor configured to translate the source text into the target text, and further configured to map the target text to the target document according to a format characteristic of the source text, wherein the processor is further configured to interrogate a user about an instance of an ambiguity in the source text, to receive a response from the user to the interrogation, and to translate the source text into the target text based at least in part on the response; and
    a memory to store a resolution of the ambiguity as a function of the response, wherein the processor applies the resolution with respect to translation of another document of a set of related documents such that the resolution applies with respect to the ambiguity within the set of related documents without any further user response with respect to the ambiguity.

* * * * *